Oct. 25, 1966 E. NINES 3,281,580

COUNTER

Filed Nov. 23, 1962 2 Sheets-Sheet 1

INVENTOR.

EUGENE NINES

BY

Busser, Smith & Harding

ATTORNEYS

INVENTOR.
EUGENE NINES
BY
Buckles, Smith & Harding
ATTORNEYS

United States Patent Office 3,281,580

Patented Oct. 25, 1966

3,281,580

COUNTER

Eugene Nines, Levittown, Pa., assignor to Fischer & Porter Company, Warminster, Pa., a corporation of Pennsylvania Filed Nov. 23, 1962, Ser. No. 239,426
6 Claims. (Cl. 235—92)

This invention relates to counters and has particular reference to counters operating in the decimal system but utilizing binary stages.

For high speed pulse counting flip-flop or bistable multivibrator stages are commonly used. These inherently count in a binary system, but since ultimate use generally involves a decimal system binary elements have been assembled in decades in which counting in the decimal system is effected by modifications involving resets of stages in various fashions so that an output is given to a decade of higher order when the input pulses count to ten. Interrelating of various binary stages to accomplish this end is not desirable, having various drawbacks particularly when high counting rates are involved. One of the objects of the present invention is the provision of a decade counter in which the transformation from binary to decimal counting is effected solely by the use of switches controlling input pulse channels. The binary stages, accordingly, do not control each other, but control only the pulse switches. Simplicity and reliability of operation are thus secured.

The improved decade counter involves a further advantage when there is to be multiplication of the input count by a predetermined factor. In such case the counter lends itself to a more uniform spacing of emitted pulses which is of particular advantage when high counting rates are involved. One of the objects of the invention accordingly involves the provision of a counter in association with a multiplier means.

Figure 1:
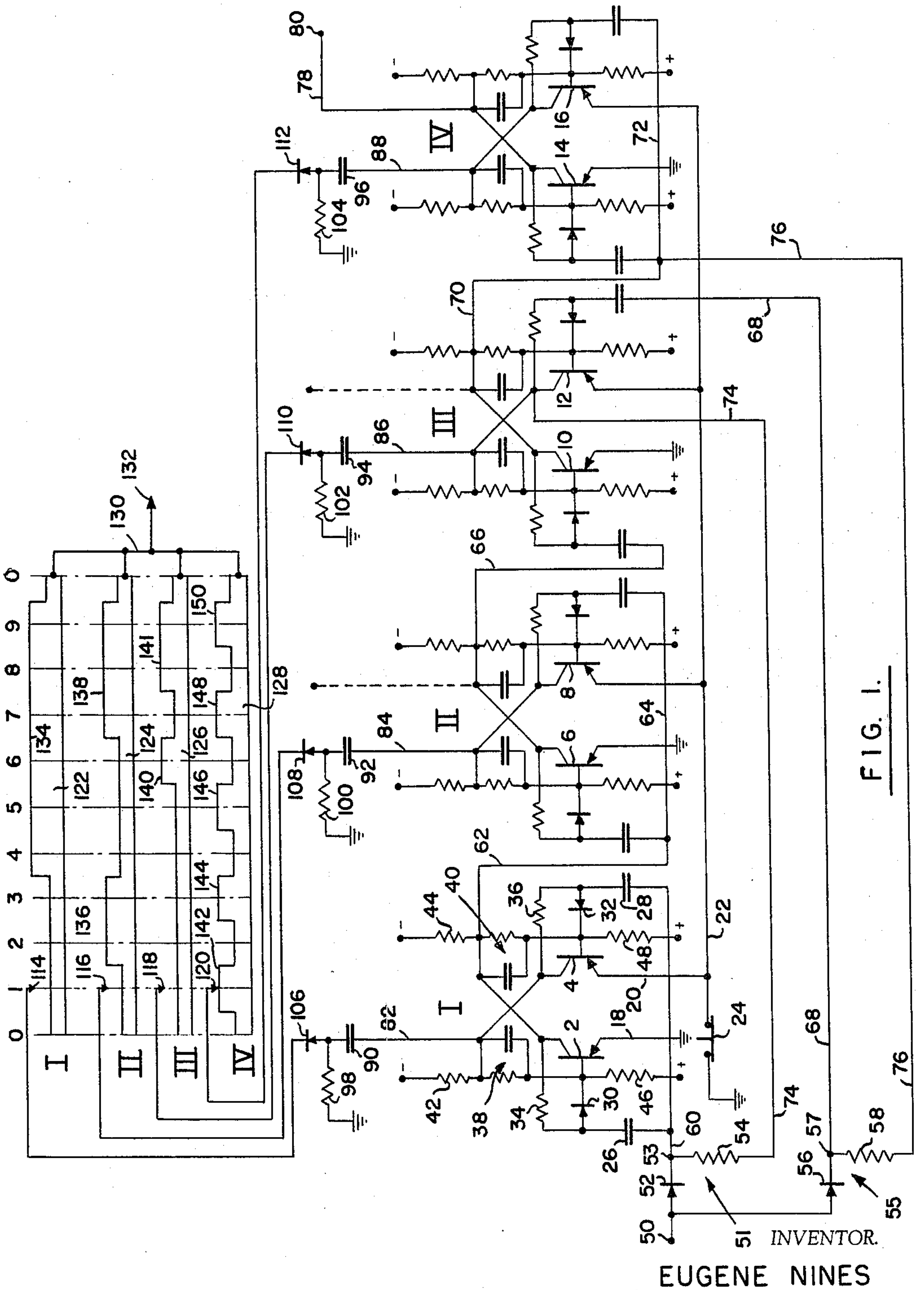
Figure 2:
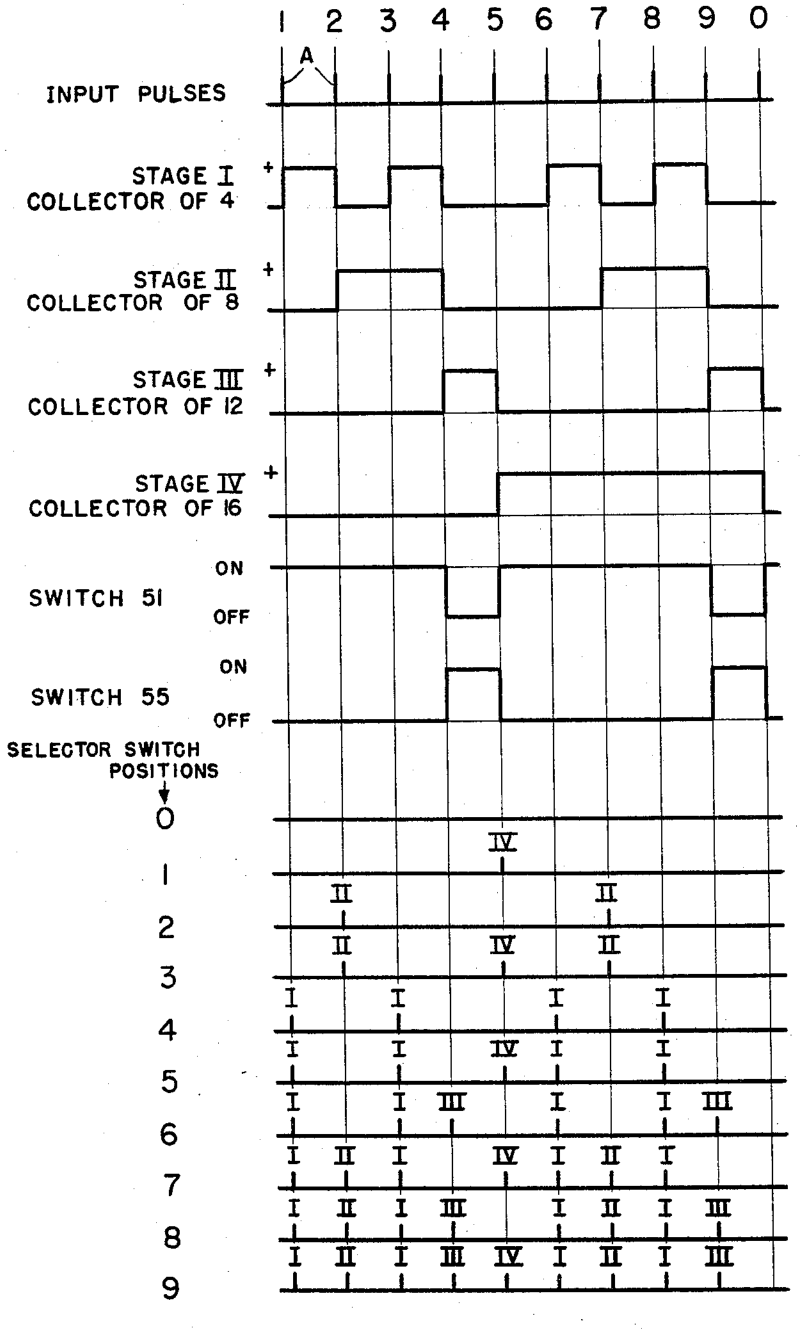

The foregoing and other objects of the invention particularly relating to details of construction and operation will become apparent from the following description, read in conjunction with the accompanying drawings, in which:

FIGURE 1 is a schematic diagram of an improved counter provided in accordance with the invention associated with a multiplying switching means; and FIGURE 2 is a pulse diagram illustrative of the operation of the system shown in FIGURE 1.

The invention will be described specifically with reference to an embodiment utilizing transistors. As will readily become apparent to those skilled in the art, thermionic elements may be used as the components of the binary stages with modifications of circuitry in accordance with well-known principles. While in the illustrated embodiment PNP transistors are shown and the supply polarities and pulse polarities are illustrated and described consistently therewith, it will be obvious that NPN transistors may be equally well used with corresponding reversals of polarity. Furthermore, the binary stages may be replaced by other types of binary stages.

Referring first to the lower portion of FIGURE 1, there is illustrated a single decade which, it will be understood, will ordinarily be cascaded with other decades to provide decimal counting in successive orders as may be required. The cascading is such that when ten pulses are counted by a decade of lower order a pulse is emitted to the next decade, and so on. Since the decades and associates parts may all be of the same construction, the description will be confined to a single decade.

The decade comprises four stages I, II, III and IV constituted by flip-flops which, in themselves, are conventional. The first stage comprises the transistors 2 and 4, the second the transistors 6 and 8, the third the transistors 10 and 12, and the fourth the transistors 14 and 16. The interconnecting circuitry of the pairs of the transistors within the several stages are identical, and consequently only the stage I will be described in detail.

The emitter of transistor 2 is connected to ground at 18. The emitter of transistor 4 is connected at 20 to a reset line 22 normally grounded but provided with a switch 24 arranged to disconnect it from ground. This switch is conventionalized but, particularly in high-speed counting, may be of electronic rather than of manual type.

Input to the base of transistor 2 is provided through capacitor 26 and diode 30. Input to the base of transistor 4 is provided through capacitor 28 and diode 32. The junctions between these capacitors and the anodes of the respective diodes are connected through resistors 34 and 36 to the respective collectors of transistors 2 and 4. RC networks 38 and 40 have their lower terminals connected to the respective bases of the transistors 2 and 4, and their upper terminals are respectively connected through resistors 42 and 44 to a negative potential terminal, which, for simplicity of showing, is shown as multiple separate terminals. Criss-cross connections of usual type are provided between the upper terminals of the network and the collectors. The bases of the respective transistors are connected through resistors 46 and 48 to a positive terminal which also, for simplicity, is diagrammed as separate terminals. While the binary stages are conventional in operation, it will aid in the understanding of a counting cycle to describe briefly the internal operation of a stage so as particularly to identify the initial and subsequent states. Resetting is accomplished by opening the connection to ground through switch 24 of the emitter of transistor 4. If this transistor is not already in nonconducting state, it will be put therein by the opening of this ground connection. Assuming, then, a start from the condition in which transistor 4 is non-conducting and transistor 2 is conducting, assume a positive pulse delivered through the capacitor 26. Though a positive pulse is delivered simultaneously through capacitor 28, the latter delivery is ineffective since the transistor 4 is already cut off. It will be noted that since the resistor 44 carries current from the collector of transistor 2 its lower end will be relatively positive, and since this is connected through the network 40 to the base of transistor 4, this base will be relatively positive. On the other hand, resistor 42 carries only negligible current in view of the cut-off condition of transistor 4 and hence the lower end of this resistor is relatively negative and renders relatively negative the base of transistor 2 to which it is connected through network 38. Starting with this static condition, representing a stable condition of the flip-flop, a positive pulse introduced through capacitor 26 and diode 30 to the base of transistor 2 will reduce the current through this transistor. This renders more negative the potential at the lower end of resistor 44 and, correspondingly, the potential at the base of transistor 4 which starts conducting. In turn, with amplification involved, this renders more positive the potential at the lower end of resistor 42, and the change toward positive potential is applied to the base of transistor 2 tending to reduce its collector current. As is well known, the operation is regenerative with the ultimate result that the stage acquires its alternate stable state with the transistor 2 cut off and transistor 4 conducting. The operation, of course, is more complex, but the foregoing will serve to stress the potential changes which take place. The next delivery of a positive pulse to the base of transistor 4 (even though not simultaneously a positive pulse is delivered to the base of transistor 2) will provide a reversal of state in the same fashion.

To summarize, therefore, for later reference, when the stage changes from its reset state (transistor 2 conducting, transistor 4 non-conducting) to its alternate state, the collector of transistor 4 swings positive, while the collector of transistor 2 swings negative. In the reverse transition from the state in which transistor 2 is non-conducting and transistor 4 is conducting, the collector of transistor 2 swings positive and the collector of transistor 4 swings negative.

Consideration may now be given to the control of input pulses and to the interconnections of the stages.

Pulses to be counted are introduced at terminal 50. Positive pulses alone are effective to produce counts, and if negative pulses appear at terminal 50 they will in any event be suppressed by the switches next described.

One switch is provided at 51 by the arrangement of diode 52 and resistor 54. A second switch is provided at 55 by the arrangement of diode 56 and resistor 58. The respective junctions between the pairs of switch elements are designated 53 and 57. The anode of diode 52 is connected to terminal 50, and the junction 53 is connected at 60 to the capacitors 26 and 28.

The collector of transistor 2 is connected at 62 and 64 to the input capacitors connected through diodes to the bases of transistors 6 and 8.

The collector of transistor 6 is connected at 66 to the input capacitor feeding the base of transistor 10. It will be noted that this connection does not run to the capacitor feeding the base of transistor 12. This is a deviation from the usual cascading of flip-flops for binary counting.

The input capacitor to the base of transistor 12 is connected through line 68 to the junction 57 of switch 55.

The collector of transistor 10 is connected at 70 and 72 to the input capacitors to the bases of transistors 14 and 16.

The collector of transistor 10 is also connected through 70 and 76 to the lower terminal of resistor 58 of the switch 55. The collector of transistor 12 is connected at 74 to the lower end of resistor 54 of switch 51.

The collector of transistor 14 is connected at 78 to the output terminal 80 of the decade, which, if associated with decades of higher order would be connected to the terminal 50 of the decade of next order.

The general operation of switches 51 and 55 may now be briefly indicated, with particular reference to switch 51 since switch 55 is identical. If the lower end of resistor 54 is positive, and to an extent exceeding the magnitude of positive input pulses, the diode 52 is held nonconductive so that pulses will not be passed through the diode to the junction 53. On the other hand, if the lower end of resistor 54 is negative, or at least lower in potential than the magnitude of the positive input pulses, the diode 52 may conduct and accordingly pass the pulses to junction 53.

The operation of the counter may now be followed through. Reference may now be made additionally to FIGURE 2.

The first graph of FIGURE 2 shows at A the positive input pulses at terminal 50, the numbers thereabove indicating successive pulses. The next four graphs indicate for the respective stages I, II, III and IV the relative potentials of the collectors of the right-hand transistors of these stages. Upper excursions of the graph represent relative positive potential.

The next two graphs indicate the on or off state of the switches 51 and 55.

Assuming an initial reset state of all of the stages, the collectors of the right-hand transistors 4, 8, 12 and 16 are all in their relatively negative states by reason of the non-conducting state of these transistors.

Switch 51 is "on" by reason of its connection at 74 to the collector of transistor 12. Switch 55 is "off" by reason of its connection 76 to the collector of conducting transistor 10, this collector being now relatively positive, essentially at ground potential.

Pulses passed by switch 51 now effect counting in conventional fashion to the extent of the first four pulses. Stage I is alternately driven to its successive states, stage II is tripped in one direction by the second pulse and returned to its original state by the fourth pulse, and stage III is first tripped by the fourth pulse.

The tripping of stage III, however, introduces control of the switches by reason of the positive swing of the collector of transistor 12 and the negative swing of the collector of transistor 10. When the collector of transistor 12 goes positive, the switch 51 is put in its "off" condition through the connection 74. At the same time, the negative swing of the collector of transistor 12, through connections 70 and 76 turns the switch 55 "on."

The fifth pulse is now ineffective to trigger stage I. However, through switch 55 and connection 68 it operates directly on the third stage to cut off transistor 12 and restore transistor 10 to conductive condition. The tripping of stage III operates stage IV through the connection 70.

The reversion of stage III to its initial state also, as will be evident, restores both switches 51 and 55 to their initial conditions.

It will now be seen that not only are the switches restored to the initial condition preceding the first pulse, but stages I, II and III are also restored to their initial conditions. Only stage IV is now in other than its reset state. Accordingly, subsequent pulses 6, 7, 8 and 9 produce the same changes as the first four pulses, with the ninth pulse producing transition of the switches in the same fashion as the fourth pulse.

The tenth pulse produces the same transistion as the fifth pulse, with the exception that now, with the transition of stage III, stage IV is restored to its initial state. This last restoration emits a positive pulse to the output terminal 80 which may be used for operation of a succeeding decade.

As will now be evident from the graphs, the decade is completely restored to its initial condition, ready for a repetition of its cycle with the reception of further pulses.

The overall operation involved will be seen to be essentially by way of groups of five pulses with succeeding groups differentiated by the state of stage IV.

The stages are controlled, not by each other from the standpoint of producing abnormal operation for the transition from binary to decade counting, but rather by the control of input pulses by operation of switches.

The described counter is particularly advantageous for use in systems which involve multiplication by preset factors which, effectively, multiply the number of counts in each decade by factors 0.0, 0.1, 0.2 . . . 0.8 or 0.9. This is effected by emitting, for each ten counts of a decade a number of counts corresponding to ten times the factor. When the total number of counts to be thus multiplied by a factor is large, the error in the result will be small percentagewise for the remainders of counts in the various decades beyond multiples of ten. However, if, for a particular run, the total number of counts introduced is small, these remainders may give rise to substantial error, and as will now be explained the present invention serves to reduce these errors.

Reference may be made to my application Serial No. 127,370, filed July 27, 1961, now Patent No. 3,169,185 That application discloses a totalizer in which pulses produced by a device such as a flowmeter may be multiplied by a desired decimal factor to produce a set of pulses which may be counted to give directly a measure in desired units and/or involving corrective factors. For example, in the case of flow measurement, taking into account calibration, ultimate measurements by counted pulses may be in terms of gallons, liters, pounds, or the like, depending on what is desired. As disclosed in said application, manual switches are settable to various digits of the factor desired. Further, unit factors may be introduced to extend the scope of the usable range. The full aspects of this are not repeated herein, but the upper portion of FIGURE 1 illustrates the connection which may be provided to a factor-sealing switch, and description of the operation will reveal the advantages of the present counter in minimizing the errors involved in low counts.

Connections 82, 84, 86 and 88 are made to the collectors of the right-hand transistors 4, 8, 12 and 16 of the successive stages. Pulses occurring in the transitions from the reset states of these stages are differentiated by the successive combinations of capacitors 90, 92, 94 and 96 with resistors 98, 100, 102, and 104, and the differentiated pulses are fed through the respective diodes 106, 108, 110 and 112, with suppression of negative pulses, to switch contacts 114, 116, 118 and 120. The manually settable switch corresponding to the decade is conventionalized in FIGURE 1, it being obvious that various physical switch arrangements may be used. Four banks are provided, and for purposes of description it may be assumed that the contacts 114, 116, 118 and 120 are moved as a unit to any numbered position corresponding to the digit of a particular order of a factor. Four banks of cooperating contact elements are indicated at 122, 124, 126 and 128, designated by Roman numerals corresponding to the stages of the counter. These last contacts are joined at 130 to a common output line 132 through which the output pulses are delivered. It will be noted that the contact 114 engages the contact 122 in the switch positions 4, 5, 6, 7, 8 and 9 as indicated by the raised portion 134. In the case of the second bank, the contact 116 engages the contact 124 in the positions 2, 3, 7, 8 and 9 as indicated at 136 and 138. In the third bank the contacts are in the positions 6, 8, and 9 as indicated at 140 and 141. In the fourth bank the contacts are in the odd numbered positions as indicated at 142, 144, 146, 148 and 150.

For the various settings of the selector switch, for each ten pulses counted by the decade counter there are emitted on line 132 a number of successive pulses corresponding to the number of the selector switch position. The final set of graphs in FIGURE 2 are numbered respectively to correspond to the selector switch positions, and positive pulses are indicated as they are emitted on line 132. These positive pulses are designated by Roman numerals corresponding to the counter stages at which they originate and the banks of the selector switch through which they pass. Examination of the graphs together with those representing the states of the stages, and considering the switch contact positions which have been mentioned will indicate clearly without detailed explanation the pattern of emitted pulses. The component pulses of an emitted group will be seen to be made up of pulses emitted from the various counter stages, there being no coincident pulses emitted from any pair of stages. What is especially significant in the matter of patterns of pulses will now be pointed out.

Examination of the pulse patterns in the lower portion of FIGURE 2 will show the achievement of a maximum degree of uniformity of distribution of the pulses in each group corresponding to a particular selector switch position. The significance of this may be readily seen by referring to a typical pattern such as that involved by the setting of the selector switch in position 5. For ten pulses five will be emitted. Assume that at the termination of counting, with the selector switch set in position 5 the count has terminated with four pulses introduced into the decade. At such termination, two pulses will have been emitted on the line 132. The factor represented is 0.5 for this setting, and the four input pulses will have emitted two pulses, giving a proper percentage. On the other hand, if the count had terminated with three input pulses, two pulses would also have been emitted. The actual number of pulses which should have been emitted would be (theoretically but of course not possibly) 1.5.

In a sense, then, the error is actually the minimum achievable. The close approximation to a proper emission of pulses will not be seen to be achieved through the maximum uniformity of distribution of pulses in the patterns, and this uniformity is achieved by the counter and may, perhaps, be best stated as tied up with the fact that the counter operates in a pattern of essential repetition of five pulse counts. What occurs in the first five pulses is repeated in the second five pulses with the exception that the pulse emitted at the count of five from stage IV is not repeated at the tenth pulse. This symmetry greatly increases the pulse pattern uniformity, resulting in a minimum percentage error in the product of a total number of pulses multiplied by the set factor. It will be readily appreciated that this is of particular importance when the total number of pulses emitted in an operation is small so that remainders are significant.

It will be evident that various changes in details may be made, not only as indicated earlier but in such matters as choice of types of switches, etc., without departing from the invention as defined in the following claims.

What is claimed is:

1. A counter comprising four binary elements each having two stable states, one of which is a reset state, and operable by input pulses, said elements being in cascade, first and second switching means arranged to receive input pulses, means connecting the first switching means to the first binary element and to the third binary element for control by the latter to effect routing of input pulses to the first binary element when the third binary element is in its reset state, and means connecting the second switching means to the third binary element for control thereby and also to the third binary element to effect routing of pulses thereto when the third binary element is in its state other than its reset state to effect its reversion to its reset state.

2. A counter according to claim 1 provided with output connections from all of said binary elements.

3. In combination with a counter according to claim 2 of selective switching means receiving pulses from the output connections from all of said binary elements and a common line arranged to receive from the selective switching means all of the pulses from said binary elements received by the selective switching means.

4. A counter comprising a series of successive binary elements each having two stable states, one of which is a reset state, and operable by input pulses, said elements being in cascade, first and second switching means arranged to receive input pulses, means connecting the first switching means to the first binary element and to a subsequent binary element for control by the latter to effect routing of input pulses to the first binary element when said subsequent binary element is in its reset state, and means connecting the second switching means to said subsequent binary element for control thereby and also to said subsequent binary element to effect routing of pulses thereto when said subsequent binary element is in its state other than its reset state to effect its reversion to its reset state.

5. A counter according to claim 4 provided with output connections from all of said binary elements.

6. In combination with a counter according to claim 5 of selective switching means receiving pulses from the output connections from all of said binary elements and a common line arranged to receive from the selective switching means all of the pulses from said binary elements received by the selective switching means.

References Cited by the Examiner

UNITED STATES PATENTS

| | | | |
|---|---|---|---|
| 2,828,071 | 3/1958 | Burton | 235—92 |
| 3,219,805 | 11/1965 | Wolfington | 235—92 |

MAYNARD R. WILBUR, *Primary Examiner.*

J. F. MILLER, *Assistant Examiner.*